United States Patent
Bindana et al.

(10) Patent No.: US 10,353,649 B1
(45) Date of Patent: Jul. 16, 2019

(54) SYSTEMS AND METHODS FOR PRINTING A DOCUMENT AND RELATED REFERENCED CONTENT

(71) Applicant: XEROX CORPORATION, Norwalk, CT (US)

(72) Inventors: Srinivasarao Bindana, Kakinada (IN); Liya Stanley, Thrissur District (IN); Davuluri Vatsalyarani, Guntur (IN)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 16/016,703

(22) Filed: Jun. 25, 2018

(51) Int. Cl.
G06F 3/12 (2006.01)
H04N 1/00 (2006.01)

(52) U.S. Cl.
CPC .......... *G06F 3/1219* (2013.01); *G06F 3/122* (2013.01); *G06F 3/1241* (2013.01); *H04N 1/00411* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,454,696 | B2* | 9/2016 | Campanelli | G06K 15/1889 |
| 2008/0184138 | A1* | 7/2008 | Krzanowski | G06F 17/30873 715/760 |
| 2014/0071473 | A1* | 3/2014 | Hohensee | G06F 3/1206 358/1.13 |
| 2015/0244892 | A1* | 8/2015 | Arputharaj | H04N 1/04 358/473 |
| 2016/0140626 | A1* | 5/2016 | Agarwal | G06Q 30/0276 715/234 |
| 2016/0274834 | A1* | 9/2016 | Fukasawa | G06F 3/1222 |

* cited by examiner

*Primary Examiner* — Helen Zong

(57) ABSTRACT

The present disclosure discloses methods and systems for printing a document and related referenced content. The method includes: receiving one or more pages of a document for printing by a multi-function device, the one or more pages include content, wherein at least one page selected for printing includes a reference, wherein content corresponding to the reference is not selected for printing. Then, content of each page selected for printing is automatically analyzed to identify the reference. Thereafter, content corresponding to the identified reference is automatically identified. The identified referenced content along with a page including the referenced content is automatically displayed via a user interface. The referenced content and the one or more pages are printed.

26 Claims, 14 Drawing Sheets

SYSTEMS AND METHODS FOR PRINTING A DOCUMENT AND RELATED REFERENCED CONTENT

TECHNICAL FIELD

The present disclosure relates to the field of printing, more specifically, relates to methods and systems for printing a document and related referenced content.

BACKGROUND

In the current printing/scanning technology, selected content is printed and/or scanned as input by a user. Sometimes a document such as a book may contain referenced content in the form of pictures, tables, diagram or text. The referenced content may be present in other pages of the document which are not selected for printing or may be present in a different document or location. When the user tries to print such documents containing referenced content, he may forget to print the referenced content which is needed by the user. In such cases, the user will have to spend extra time and effort to find the referenced content which is present in different pages of the document or at a different location.

In case of scanning, if the user wishes to append content i.e., insert pictures or diagrams from an external source to a scanned document, he has to use multiple softwares to add objects at the right place in the document and this is tiresome and consumes lot of time and manpower. Currently if the user needs to extract only the pictures or tables from a document (either from a scanned document or a soft copy), they need to use applications to extract/crop the pictures or tables from each page of the document, combine those into different files and then print or scan. This also takes lot of time and manual work. Therefore, there is a need for efficient methods and systems to overcome the mentioned problems.

SUMMARY

According to aspects illustrated herein, there is provided a method for printing referenced content. The method includes receiving one or more pages of a document for printing by a multi-function device, the one or more pages include content, wherein at least one page selected for printing includes a reference, wherein content corresponding to the reference is not selected for printing. Then, content of each page selected for printing is automatically analyzed to identify the reference. Thereafter, content corresponding to the identified reference is automatically identified. The identified referenced content along with a page including the referenced content is automatically displayed via a user interface. The referenced content and the one or more pages selected for printing, are finally printed.

According to further aspects illustrated herein, a multi-function device is disclosed. The multi-function device includes a receiver, a document processor, a user interface and a print engine. The receiver is configured for receiving one or more pages of a document for printing, the one or more pages include content, wherein at least one page selected for printing includes a reference, wherein content corresponding to the reference is not selected for printing. The document processor is configured for: automatically analyzing content of each page selected for printing to identify the reference; and automatically identifying content corresponding to the identified reference. The user interface is configured for displaying the identified referenced content along with a page including the referenced content. The print engine is configured for printing the referenced content and the one or more pages.

According to additional aspects illustrated herein, a method for printing one or more pages and related referenced content is disclosed. The method includes: receiving a request for printing one or more pages, wherein the one or more pages include content, wherein at least one page selected for printing includes reference to the content, wherein content corresponding to the reference is not selected for printing. The one or more pages are analyzed to identify the reference. The content corresponding to the reference is identified. A user interface is provided to a user to select an option for printing the content corresponding to the reference. The content corresponding to the reference is processed in accordance with the selected option. Finally, the content corresponding to the reference is printed in accordance with the selected option and the one or more pages are printed.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

DESCRIPTION

Figure 1A:
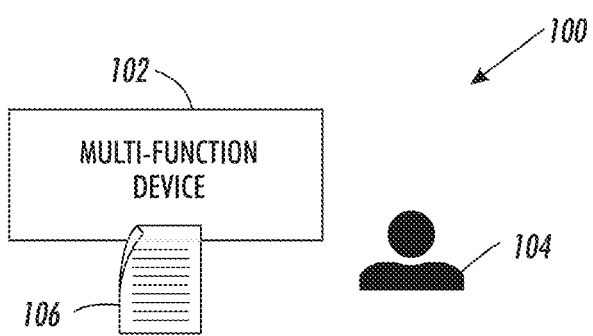
FIG. 1A illustrates an exemplary environment in which various embodiments of the disclosure can be practiced.

A few inventive aspects of the disclosed embodiments are explained in detail below with reference to the various figures. Embodiments are described to illustrate the disclosed subject matter, not to limit its scope, which is defined by the claims. Those of ordinary skill in the art will recognize a number of equivalent variations of the various features provided in the description that follows.

Non-Limiting Definitions

Definitions of one or more terms that will be used in this disclosure are described below without limitations. For a person skilled in the art, it is understood that the definitions are provided just for the sake of clarity and are intended to include more examples than just provided below.

The term "multi-function device" refers to a device or a combination of multiple devices configured to perform one or more functions, but not limited to, scanning, printing, copying, imaging, and so forth. The multi-function device includes software, hardware, firmware, or combination thereof. In context of the current disclosure, the multi-function device manages referenced content while printing a document. Here, printing of the document includes printing one or more pages as selected by a user. Specifically, the multi-function device prints the referenced content while printing the one or more pages of the document.

The term "document" refers to any document related to a user. Various examples of the document include, but not limited to, Portable Document Format (PDF), Microsoft DOC format, Hypertext Markup Language (HTML) format, Extensible Markup Language (XML) format, Microsoft XLS format, and Tag Image File Format (TIFF). The document can be in a virtual or software form (embodied in a software file). The virtual form can also be referred to as digital form, electronic version or the like. Further, the document includes content and a reference. The content can be in the form of text, image, graphics, or a combination thereof.

The term "reference" indicates an identifier to: a content present in pages not selected for printing or content present outside the document. The reference may be alphanumeric or numeric such as figure 1, table 2, diagram 5, and so on. The reference may be present on any page selected for printing.

The "referenced content" includes content which is referenced from a page that is requested for printing but appears on a page/document which is not selected for printing. The referenced content is also referred to as "content corresponding to the reference." The referenced content may be in the form of an object and the object may include a figure, a table, a picture, an image, a diagram, an equation, text content without limiting the scope of the disclosure.

The term "computing device" refers to a user device that the user typically uses for giving print commands. Examples of the computing device include, but are not limited to, a personal computer, a laptop, a mobile phone, a tablet, PDA, a smart-phone or any other device capable of data communication.

Overview

The present disclosure discloses methods and systems for managing referenced content while printing, more specifically, discloses methods and systems for printing a document and related referenced content. The referenced content can be printed separately from the document or can be printed as a part of the document. In some embodiments, the referenced content can be extracted and printed along with the document. In some embodiments, the referenced content can be appended to the document and printed as a part of the document. The referenced content may include any object such as a figure, a table, a picture, a diagram, an equation, text content, etc. The referenced content may include a figure which is referenced from a page that is requested for printing but appear on a page which is not selected for printing.

According to aspects illustrated herein, there is provided a method for printing referenced content. The method includes receiving one or more pages of a document for printing by a multi-function device, the one or more pages including content, wherein at least one page selected for printing includes a reference, wherein content corresponding to the reference is not selected for printing. Then, content of each page selected for printing is automatically analyzed to identify the reference. Thereafter, content corresponding to the identified reference is automatically identified. The identified referenced content along with a page including the referenced content is automatically displayed via a user interface. The referenced content and the one or more pages selected for printing, are finally printed.

The method includes appending the referenced content to the one or more pages selected for printing. The method includes further includes printing the referenced content as a part of the one or more pages selected for printing. The method includes checking available space on the page including the reference. The method further includes fitting the referenced content on the page including the reference, based on the available space. The method includes printing the referenced content along with the one or more pages selected for printing. The method includes extracting the referenced content from the page including the referenced content. The reference is identified when a request to print a subset of pages of the document is received. The reference is identified based on one or more keywords. The referenced content is a part of one of: the document and a new document. The method includes providing a user interface to select a print output type for the referenced content.

According to further aspects illustrated herein, a multi-function device is disclosed. The multi-function device includes a receiver, a document processor, a user interface and a print engine. The receiver is configured for receiving one or more pages of a document for printing, the one or more pages includes content, wherein at least one page selected for printing includes a reference, wherein content corresponding to the reference is not selected for printing. The document processor is configured for automatically analyzing content of each page selected for printing to identify the reference; and automatically identifying content corresponding to the identified reference. The user interface is configured for displaying the identified referenced content along with a page including the referenced content. The print engine is configured for printing the referenced content and the one or more pages selected for printing.

The document processor is configured for appending the referenced content to the one or more pages selected for printing. The print engine is configured for printing the referenced content as a part of the one or more pages selected for printing. The document processor is configured for checking available space on the page including the reference. The document processor is configured for fitting the referenced content on the page including the reference, based on the available space. The print engine is configured for printing the referenced content along with the one or more pages selected for printing. The document processor is configured for extracting the referenced content from the page including the referenced content. The referenced content is a part of one of: the document, and a new document. The user interface is configured for providing an option to a user to select a print output type for the referenced content. The print output type includes one of extraction of the referenced content and appending of the referenced content.

According to additional aspects illustrated herein, a method for printing one or more pages and related referenced content is disclosed. The method includes: receiving a request for printing one or more pages, wherein the one or more pages include content, wherein at least one page selected for printing includes a reference, wherein content corresponding to the reference is not selected for printing. The one or more pages are analyzed to identify the reference. The content corresponding to the reference is identified. A user interface is provided to a user to select an option for printing the content corresponding to the reference. The content corresponding to the reference is processed in accordance with the selected option. Finally, the content corresponding to the reference is printed in accordance with the selected option and the one or more pages are printed.

The option includes: extracting the content corresponding to the reference and appending the content corresponding to the reference. The method includes printing the content corresponding to the reference as a part of the one or more pages selected for printing. The method includes printing the content corresponding to the reference along with the one or more pages selected for printing. The method is implemented by a non-transitory computer-readable media having computer-executable instructions.

Exemplary Environment

FIG. 1A is an exemplary environment 100 in which various embodiments of the disclosure can be practiced. The environment 100 includes a multi-function device 102, a user 104, and a document 106. Various examples of the multi-function device 102 include, but not limited to, a multi-function printer, a scanner, a printer, or the like. The environment 100 may optionally include a computing device (although not shown). Examples of the computing device may include a personal computer, a laptop, a mobile phone, a tablet, PDA, a smart-phone or any other device capable of data communication. The multi-function device 102 receives the document 106 for printing via the computing device. In other examples, the multi-function device 102 receives the document 106 for printing via a Universal Serial Bus (USB), via a network, via a memory of the multi-function device 102 and so on.

Figure 1B:
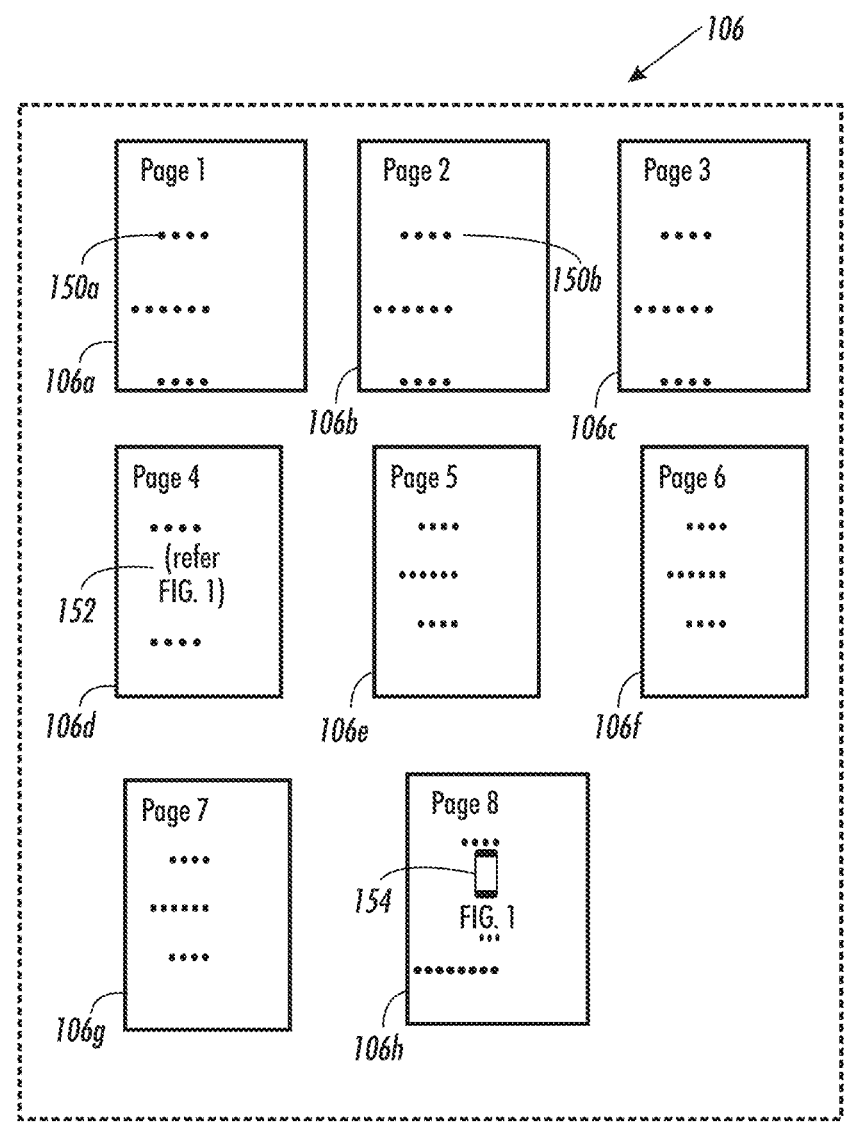
FIG. 1B shows a document with multiple pages.

The document 106 represents any document related to the user 104 such as a text book, a research document, a project document, thesis, a journal, a report, a user guide, and so forth. The document 106 is a large-sized document containing multiple pages. The document 106 may or may not have page numbers associated with the document 106. The document 106 is of a pre-defined size such as A4 size. However, the document 106 may be implemented for other sizes such as A2, A3, A5 and others without limiting the scope of the disclosure. The document 106 is a multi-page document such as a book without limiting the scope of the disclosure. The document 106 includes one or more pages, each page having content. The document 106 may optionally include a heading and an index. The content can be in the form of text, images, graphics of combination thereof. In context of the current disclosure, at least one page of the document 106 includes a reference to content. The reference points to, for example, a figure or a table which is useful for understanding the content of the at least one page having the reference. The referenced content includes content which is referenced from a page that is requested for printing but appears on a page which is not selected for printing. The referenced content may be a table, a figure, a picture, an image, a diagram, text, an equation, a numerical defined as keywords or the like. As shown in the example of FIG. 1B, the reference is marked as 152 and the referenced content is marked as 154. The referenced content 154 is the actual figure of a mobile device and is referenced from a page, i.e., page 4 marked as 106d, but the referenced content appears on a page not selected or printing, i.e., page 8 marked as 106h.

As shown, the user 104 uses the multi-function device 102 for his day-to-day activities such as printing the document 106, scanning the document 106, copying the document 106, imaging and so forth. In context of the current disclosure, the multi-function device 102 manages referenced content while printing, i.e., prints the referenced content while printing content of the document 106 as selected by the user 104. In detail, the multi-function device 102 receives one or more pages of the document 106 for printing. The multi-function device 102 analyzes the one or more pages to identify a reference to content. For example, the multi-function device 102 identifies whether the reference indicates a reference to a figure such as FIG. 5, a reference to a table such as table 3, a reference to a numerical and so on. The multi-function device 102 then identifies content corresponding to the reference. A customized option is provided to the user 104 whether he wishes to extract the referenced content and print separately, or if he wishes to append the referenced content with the one or more pages selected for printing and print the referenced content as a part of the document 106, i.e., the one or more pages. Based on the user selection to the option, the multi-function device 102 automatically either extracts the referenced content or appends the referenced content to the one or more pages. In this manner, the multi-function device 102 manages the referenced content based on the requirements of the user 104.

FIG. 1B shows a number of pages of the document 106 as referred in FIG. 1A. As shown, the document 106 includes a number of pages as 106a, 106b, 106c, 106d, 106e, 106f, 106g, and 106h. The document 106 includes 8 pages marked from page 1 to page 8. Each page 106a-106h includes content (shown via dotted lines) marked as 150a, 150b and so on. The page 106d (i.e., page 4) includes a reference such as "refer FIG. 1B," marked as 152. Further, content corresponding to the reference 152 is identified. Here, the content corresponding to the reference 152 is present on the page 106h (i.e., page 8). In the present example, the content corresponding to the reference 152 is an image marked as 154.

Exemplary System

Figure 2A:
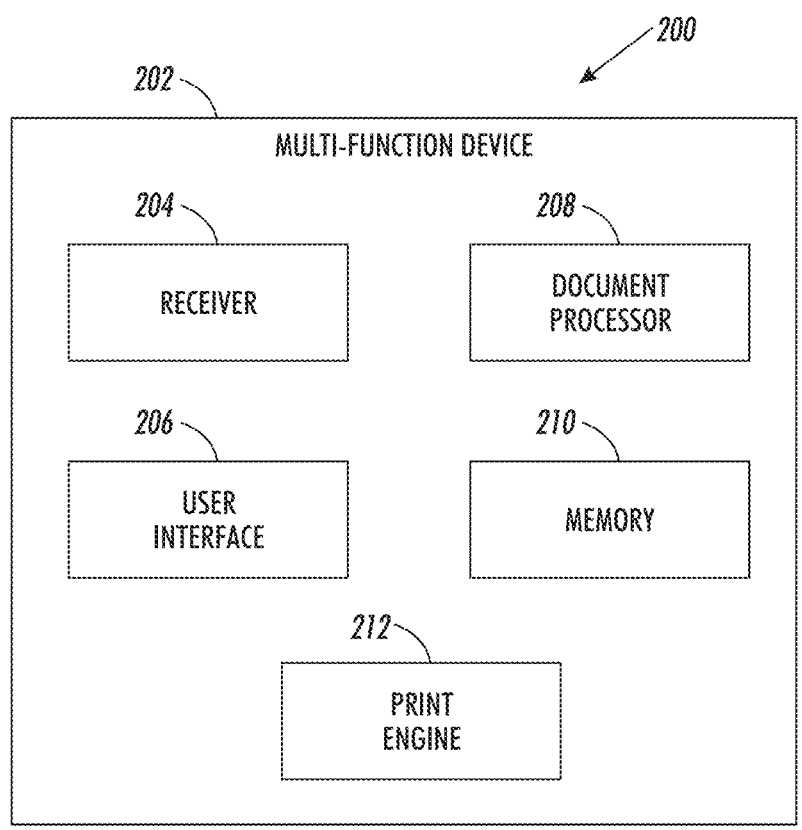
FIG. 2A is an overall system for printing a document and related referenced content.
Figure 2B:
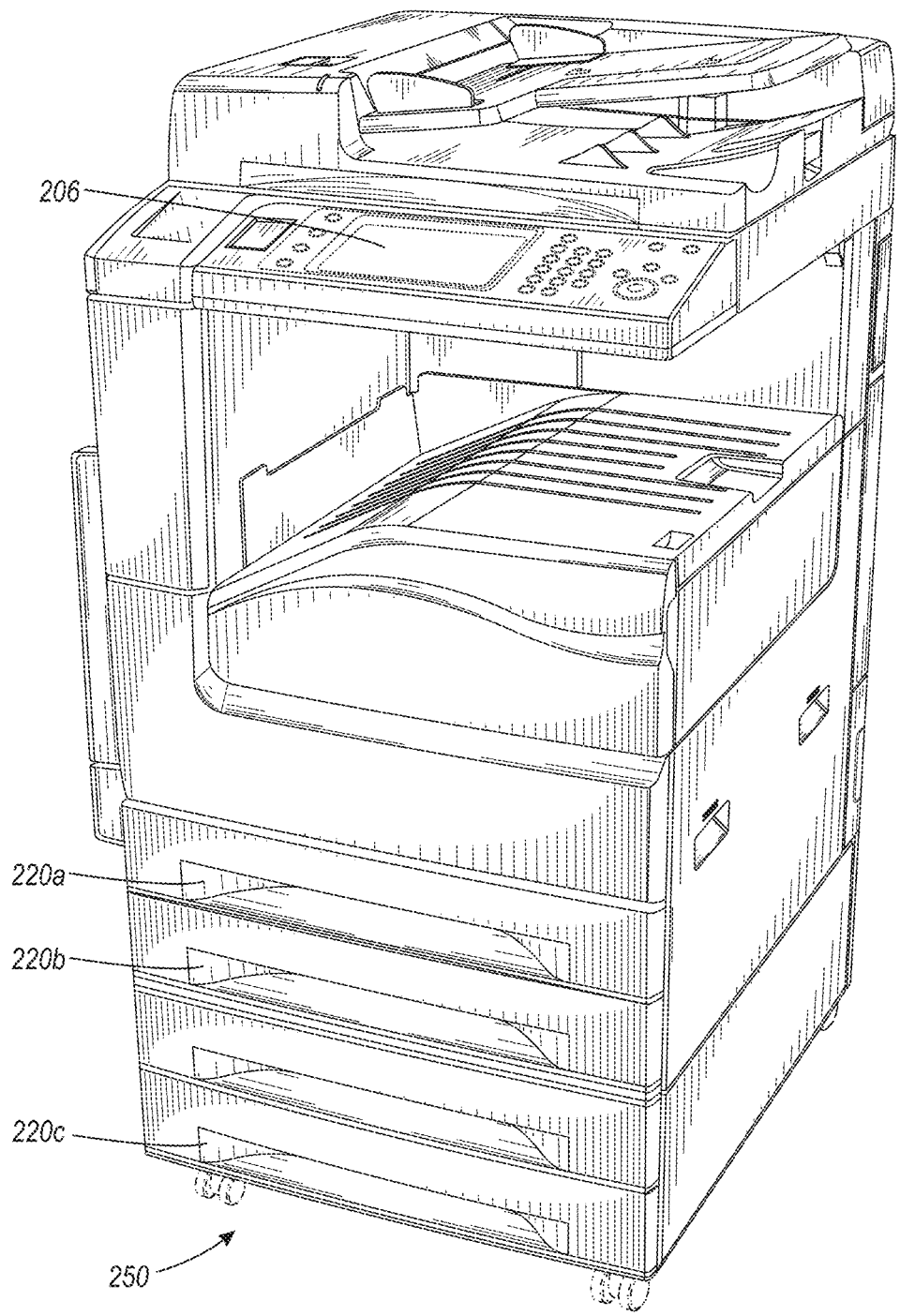
FIG. 2B represents a real view of the system shown in FIG. 2A.

FIG. 2A shows an overall system 200 for printing one or more pages and related referenced content, i.e., content which is referred in the one or more pages, but the actual referenced content is present on different pages. As shown, the system 200 includes a multi-function device 202. The multi-function device 202 includes a receiver 204, a user interface 206, a document processor 208, a memory 210, a print engine 212. Each of the components 204, 206, 208, 210, and 212 are coupled to each other via a communication bus or later developed protocols and each of the components communicate with each other for managing referenced content while printing a document. The multi-function device 202 may include one or more additional components as required to implement the current disclosure. FIG. 2B shows a real view 250 of the multi-function device 202 as depicted in FIG. 2A. The multi-function device 202 includes the user interface 206 and one or more paper supply trays marked as 220a, 220b, and 220c without interfering the implementation of the present disclosure.

The receiver 204 receives a document for printing, in particular, the receiver 204 receives a request for printing one or more pages of a document. The one or more pages are selected or input by a user for printing. The document may be submitted for printing via a computing device. The document may be uploaded to the multi-function device 202 via an external location. The document may be obtained after scanning. The document may be received directly via an email. The one or more pages of the document may include content in various forms as discussed above and at least one page of the document includes a reference. Moreover, content corresponding to the reference is not present in the one or more pages selected for printing but is present in other page(s) of the document not selected for printing. In other examples, the content corresponding to the reference is present in other document which is not selected for printing. The document as received is transmitted to the document processor 208 for further processing.

The document processor 208 receives the document for processing, i.e., the document processor 208 processes the one or more pages selected by the user for printing. The document processor 208 automatically analyzes the one or more pages selected for printing to identify a reference. Here, the document processor 208 analyzes each page to identify a reference. The reference may be identified based on one or more keywords such as "reference to," "refer," "see," "figure," "fig.," "source," or the like. The document processor 208 identifies content corresponding to the reference. The document processor 208 further checks whether content related to the reference is present on any of the pages selected for printing or is present in remaining part of the document, i.e., pages not selected for printing.

The document processor 208 searches for keywords of the reference in other pages of the document. If any of the keyword present in the reference is found/matched, pages containing the required keyword is displayed along with the referenced content. In some embodiments, multiple mathematical algorithms may be used to check the similarity of the keywords, i.e., identification of the referenced content. For example, such keywords may be used as "Refer," "Fig.," "Table." In other examples, "brute force," "string," "REGEX algorithm," or a combination of these algorithms, may be used to identify the referenced content. Any of the known algorithms or later developed algorithms may be used to identify the referenced content, i.e., content corresponding to the reference, based on different keywords.

After identifying content corresponding to the reference, the document processor 208 receives an input from the user on the print output type. Based on the input provided by the user via the user interface 206, the document processor 208 either extracts the referenced content or appends the referenced content. The referenced content can be extracted using one or more techniques such as Optical Character Recognition, Intelligent Character Recognition or a combination thereof. In this manner, the document processor 208 extracts the referenced content for printing.

The document processor 208 appends the referenced content to the one or more pages selected for printing. The document processor 208 checks the available space for adding the referenced content on the page including the reference. The document processor 208 fits the referenced content on the page including the reference, based on the available space. If the space permits, the referenced content is added to the page including the reference rather than increasing the number of pages for printing. In this manner, the document processor 208 appends the referenced content to the original content received for printing.

The document processor 208 transmits the processed referenced content, i.e., the extracted referenced content or the appended referenced content, to the print engine 212 for printing. In case of the extracted referenced content, the print engine 212 prints the referenced content along with the one or more pages selected for printing. In case of appended referenced content, the print engine 212 prints the referenced content as a part of the original content received for printing, i.e., the one or more pages.

The user interface 206 is configured for providing an option to the user to select a print output type for printing the referenced content. The print output type may be extraction of the referenced content or appending the referenced content. The user interface 206 displays options to the user and further allows him to choose one of the displayed options. For example, the option may be whether he wishes to print the referenced content as a part of the document. In another example, the option may be if he wishes to print the referenced content separately than the one or more pages selected for printing. The user interface 206 provides a customized option to the user as per his requirements.

The memory 210 stores the document received for printing and options selected by the user for future reference. The memory 210 stores the referenced content. The memory 210 may further store any relevant information required for implementing the current disclosure.

The components as shown are exemplary in nature and the required modifications to these components can be made for implementing the present disclosure. For example, the functionalities discussed above can be incorporated into a single module without limiting the scope of the disclosure. In another example, the system 200 can be implemented in the form of a multi-function device 202 connected to a server (although not shown) via a suitable network as known or later developed network. The multi-function device 202 provides the received document, user input and the necessary details as discussed above, to the server for processing. The server performs the functionalities of reference identification, referenced content identification and further appends or extracts the referenced content. The server sends the processed information to the multi-function device 202 for printing.

Exemplary Flowcharts

Figure 3:
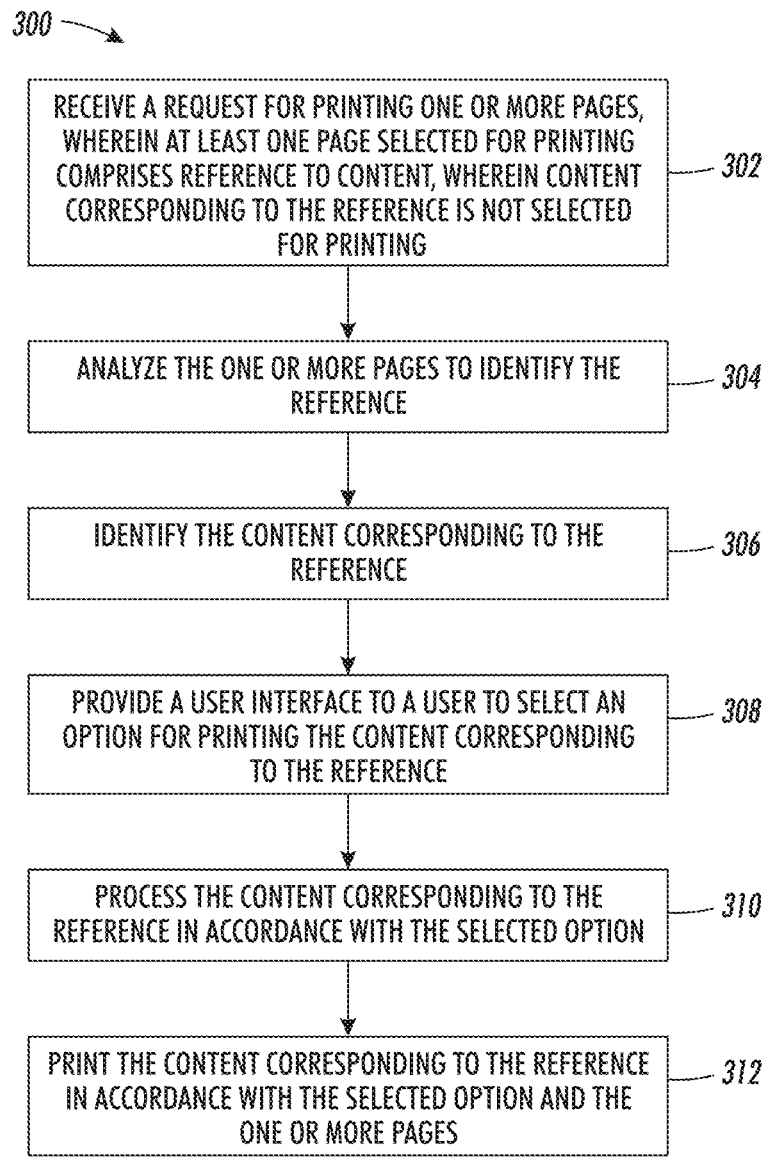
FIG. 3 is a method flowchart for managing a referenced content present in a document.

FIG. 3 is a method flowchart 300 for printing a document and referenced content. The method begins with a user submitting a document for printing via a computing device. The document may be submitted by the user via other ways as discussed above. The document includes a plurality of pages, where each page includes content in the form of text, images, graphics or a combination thereof. The method is implemented by a multi-function device or a printer when the user submits a request for printing a subset of the document. For example, if the document includes 20 pages, the user submits a request for printing 10 pages, 5 pages, and so on. And at least one page submitted for printing includes a reference and content corresponding to the reference (i.e., referenced content) is present on other pages which are not a part of the print selection. The method is implemented by a non-transitory computer-readable media having computer-executable instructions At 302, a request for printing the one or more pages selected by the user is received. At least one page selected for printing includes a reference. Here, content corresponding to the reference is not selected for printing.

At 304, the one or more pages received for printing are analyzed to identify the reference. The reference is identified based on one or keywords as discussed above. At 306, the content corresponding to the reference is identified. The content identification includes identifying a page number where the referenced content is discussed/present. If the identified page number is different from page numbers of the one or more pages selected for printing, the referenced content is considered for printing. The content identification includes comparing a pre-defined set of keywords of the reference, such as "Figure," "Fig.," "reference," "see," and further matches the next occurrence of the same keyword. If the keywords are found on the same page, no pop-up is raised. But if the match is found on a different page, a pop-up message is presented to the user via a user interface. Here, at 308, a user interface is provided to the user to select an option for printing the content corresponding to the reference. The option includes (i) printing the content corresponding to the reference as a part of the document (i.e., the one or more pages selected for printing), or (ii) printing the content corresponding to the reference separately, i.e., along with the one or more pages selected for printing. The selections made by the user are received and stored for further processing. In option (i), the content corresponding to the reference is extracted while in the option (ii), the content corresponding to the reference is appended to the one or more pages selected for printing.

Based on the selected option, the content corresponding to the reference is processed in accordance with the selected option at 310. At 312, the content corresponding to the reference is printed in accordance with the selected option and the one or more pages are printed. The printed content corresponding to the reference helps the user have more details of the reference and provides direct access to the referenced content.

Figure 4:
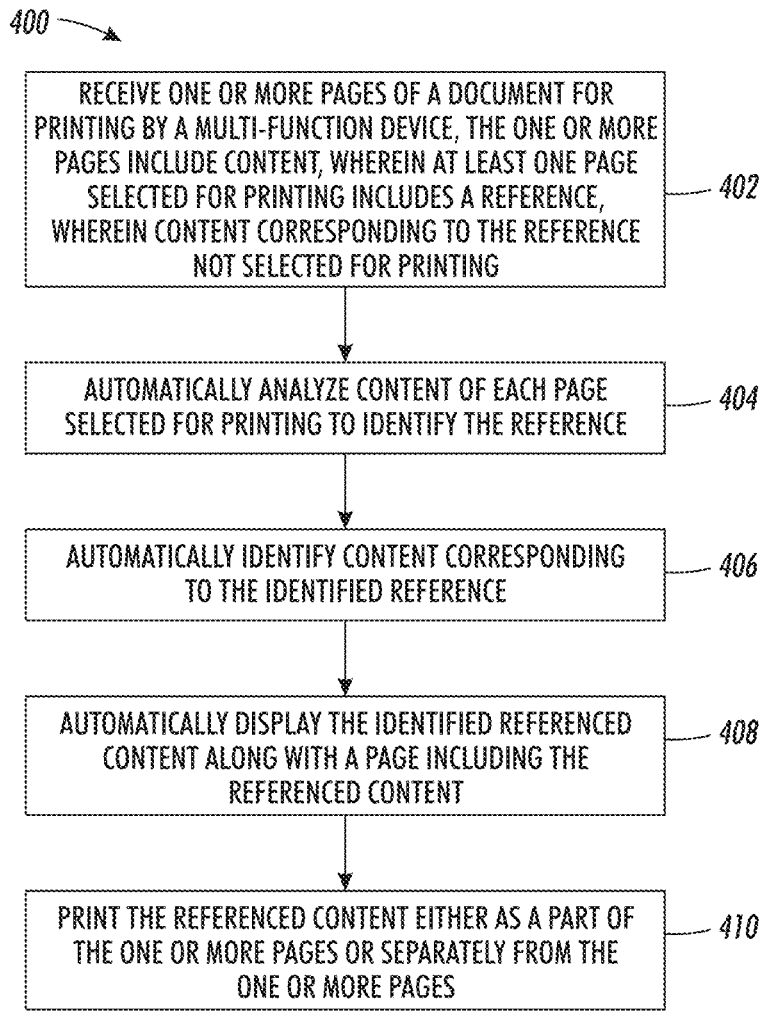
FIG. 4 is a method flowchart for printing a document and related referenced content.

FIG. 4 is a method flowchart 400 for printing a document and related referenced content. The method can be implemented by a multi-function device, a printer, a scanner, a multi-function peripheral or any equivalent device with printing and/or scanning capabilities. The method is implemented for scenarios where a document contains reference and the user wishes to print and/or scan content corresponding to the reference. The method is explained with respect to printing scenarios, however, it is understood that the method is equally applicable for scanning scenarios.

The method begins at 402 with a request for printing a document, for example, a book. The document includes a plurality of pages having content. The content can be in the form of text, graphics, objects, or a combination thereof. At least one page includes a reference and content corresponding to the reference is not selected for printing. Similarly, the referenced content can be in the form of text, graphics, objects, or a combination thereof. The document is received by the multi-function device for further processing. It is then checked whether the request for printing indicates a request for printing the entire document or printing a subset of the document, i.e., the one or more pages of the document. If the request is for printing the entire document, the methods proceeds with conventional way of printing the entire document. Else, the method proceeds to 404.

Each page selected for printing is automatically analyzed to identify a reference at 404. The reference is identified when a request to print a subset of pages of the document is received. The reference is identified based on one or more keywords as discussed above. The method includes displaying the number of references referred in each page selected for printing. For example, the user interface displays page 1 and includes 2 references, where number of figures are 2, number of tables are 0, and so on (FIG. 6E). Along with this, the user interface displays the reference page number as well, i.e., the page number where the reference content is found.

At 406, content corresponding to the identified reference is automatically identified. The referenced content identification includes checking the next occurrence of the reference. If the reference is identified on any pages selected for printing, the method proceeds with conventional way of printing. If the reference is identified on remaining pages of the document, the method proceeds further.

After identification, the referenced content is displayed along with a page including the referenced content, at 408. The referenced content is displayed as a print preview via a user interface. At 410, the referenced content and the one or more pages are printed. The referenced content can be printed as a part of the one or more pages or the referenced content can be printed separately from the one or more pages. In scenarios where the referenced content is printed as a part of the one or more pages, the referenced content is appended to the one or more pages selected for printing. Before appending the referenced content, the available space on the page including the reference is checked and the space required for the referenced content is checked. Based on the available space, the referenced content is fitted on the page including the reference. In other scenarios, where the referenced content can be printed separately from the one or more pages, the referenced content is extracted from the page including the referenced content. The referenced content here is a part of the same document submitted for printing.

In other examples, the referenced content may be a part of a new document. In such scenarios, where the referenced content is a part of the new document, a user interface is provided to the user to select the new document containing the referenced content. The new document may be uploaded to the multi-function device or may be selected otherwise. The new document is analyzed to identify the referenced content. Once identified, the method is performed in the same manner as discussed above.

Exemplary Flowchart: Appending Option

Figure 5A:
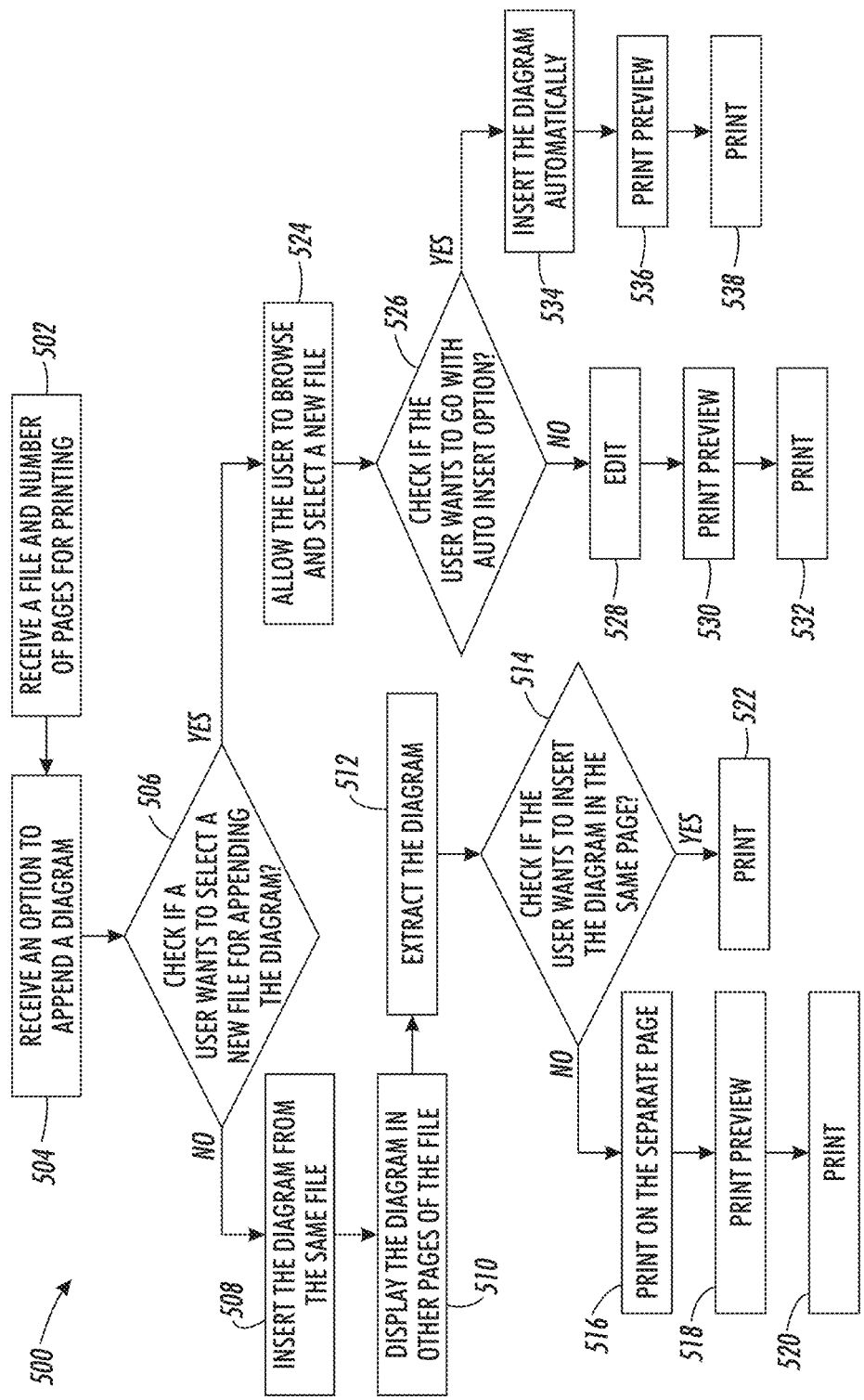
FIG. 5A is a method flowchart for printing a referenced content by appending the referenced content to one or more pages selected for printing.

FIG. 5A is a flowchart 500 discussed when a user selects appending option for printing referenced content. The method 500 begins with receiving a file/document and number of pages for printing at 502. At least one page selected for printing includes a reference. The steps of reference identification and referenced content identification remain the same as discussed above and the method specifically focuses on discussing the aspect when the user selects an option of appending the referenced content. Here the referenced content is considered as a diagram for easy understanding. At 504, an option to append a diagram is received. At 506, it is checked whether the user wants to select a new file for appending the diagram. If the user selects No, the method moves to 508. At 508, the diagram is inserted from the same file. At 510, the diagram referenced in other pages of the file is displayed. At 512, the diagram is extracted. At 514, it is further checked whether the user wants to insert the diagram in the same page where the reference is present. If the user selects yes, the method moves to 522. At 522, the diagram is printed. If the user selects No, the method moves to 516, where the diagram is printed on a separate page. At 518, print preview of the diagram is shown to the user. At 520, the diagram is printed.

Referring back to 506, if the user selects Yes, the method moves to 524. At 524, the user is allowed to browse and select a new file. At 526, it is checked whether the user wishes to go for auto-insert option. If the user selects yes, at 534, the diagram is inserted automatically. At 536, a print preview of the diagram is shown. Finally, at 538, the diagram is printed. But if the user selects No at 526, the method moves to 528. At 528, an edit option is provided to the user to make any modifications to the diagram. At 530, print preview of diagram is shown. Finally, at 532, the diagram is printed.

Exemplary Flowchart: Extraction Option

Figure 5B:
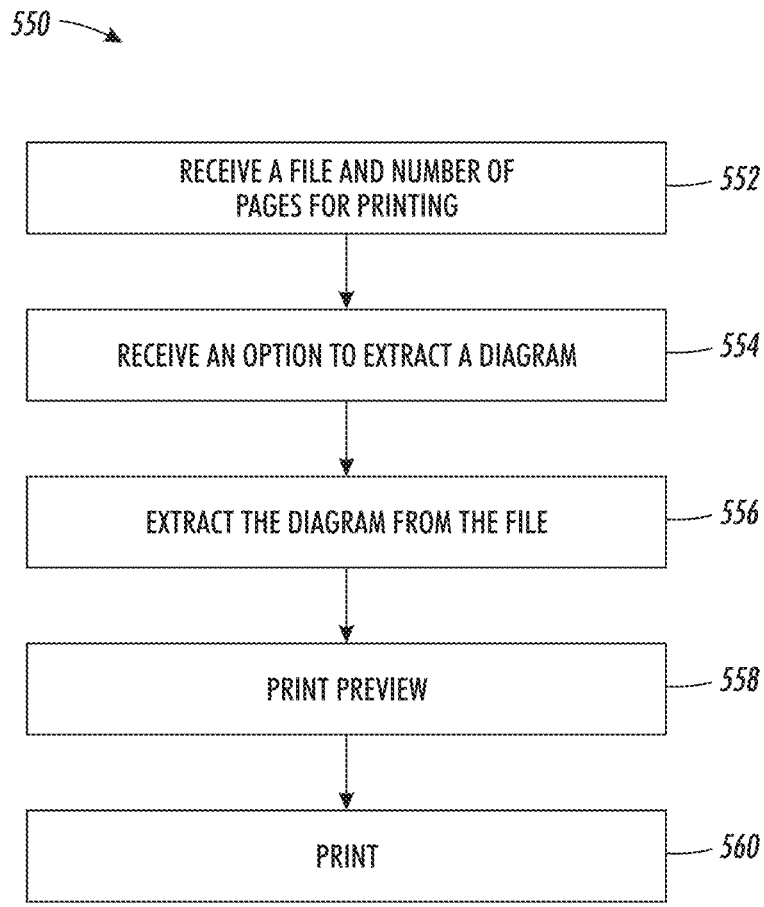
FIG. 5B is a flowchart for printing a referenced content by extracting the referenced content.

FIG. 5B is a flowchart 550 discussed when a user selects extraction option for printing referenced content. The method 550 begins with receiving a document and number of pages for printing at 552. At least one page selected for printing includes a reference. The steps of reference identification and referenced content identification remain the same as discussed above and the method specifically focuses on discussing the aspect when the user selects the option of extraction. Here the referenced content is considered as a diagram for easy understanding. At 554, an option to extract a diagram is received. At 556, the diagram is extracted from the document. At 558, a print preview of the extracted diagram is shown. At 560, the extracted diagram is printed. The extracted diagram is printed separately from the pages received for printing.

The present disclosure is discussed with respect to printing referenced content and pages selected for printing, however, the disclosure can be implemented for other scenarios. In one example, when the user only wants to print the referenced content. In another example, when a user simply wants to extract content from scanned documents and further wants to print or save the extracted content as a different file. The user uploads the scanned file, or the scanned file is obtained after scanning. Then, an option is provided to the user to extract the text or object from the scanned file. The object may be a picture, a table, a figure, and so on. If the user selects the text, multiple text recognition algorithms are used for identifying text from the scanned image such as Optical Character Recognition (OCR), Intelligent Character Recognition or a combination thereof. The text content is automatically extracted and saved as a separate file. If the user selects the object such as a picture, then matching algorithms such as gray scale matching or gradient matching are used for the picture identification. The picture is automatically extracted and saved as a separate file. The user may further print the extracted text content or the picture content separately. The user may further print the extracted text content or the picture content as a part of any document he wishes to print. In such cases, the extracted text content or the picture content can be appended or added to any document may be a scanned document or a normal electronic document. In view of the above, the present disclosure avoids the need or use of use multiple softwares to add content at the right place in a document.

Exemplary Case Scenarios

For better understanding of the present disclosure, an example is discussed. It is considered that a user has a document containing 10 pages and the user wishes to print first 5 pages. The user submits a request to print the 1-5 pages. The request is received along with the document. Further, page 3 of the document includes a reference to a figure such as FIG. 3.3.2.1, where the actual figure and text corresponding to the figure is present on page 6 of the document. Each page received for printing is analyzed to identify the reference such as "FIG. 3.3.2.1." Upon identification, a prompt is generated for the user indicating "FIG. 3.3.2.1" which is referred in the page 3 and the actual figure and text corresponding to the figure is located on page 6. If the user confirms to print the "FIG. 3.3.2.1," the actual figure and text corresponding to the figure is printed either separately or as a part of 1-5 pages i.e., printed as a part of page 3 where it is referred.

Exemplary Snapshots

Uploading

Figure 6A:
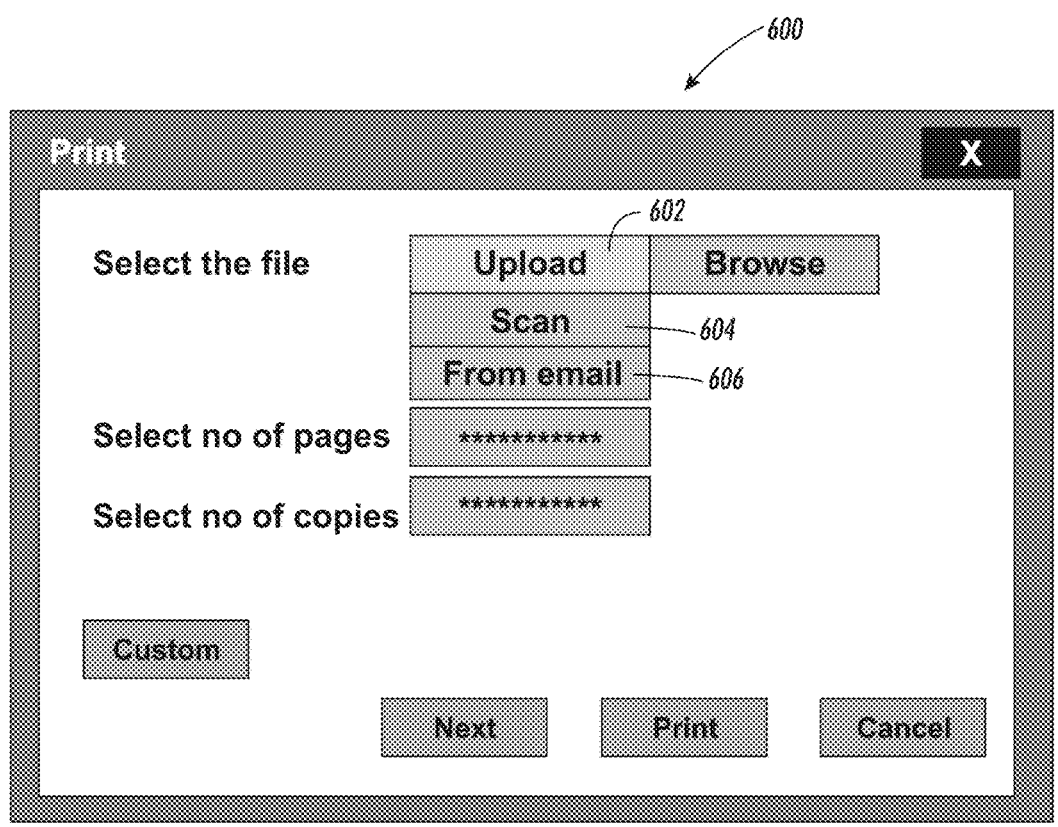
FIGS. 6A-6F show various snapshots of a user interface, according to an exemplary embodiment of the present disclosure.

FIG. 6A shows various options or ways for providing a document to the multi-function device for printing. As shown in the snapshot 600 of FIG. 6A, the user may upload (marked as 602) the document, or the user may obtain the document for printing by scanning the document (marked as 604 option). The document may be obtained from the email directly (marked as 606). The user may further provide the number of pages, number of copies and so on via the user interface 600 as shown. The user interface 600 provides the flexibility to provide the document for printing.

Custom Option

Figure 6B:
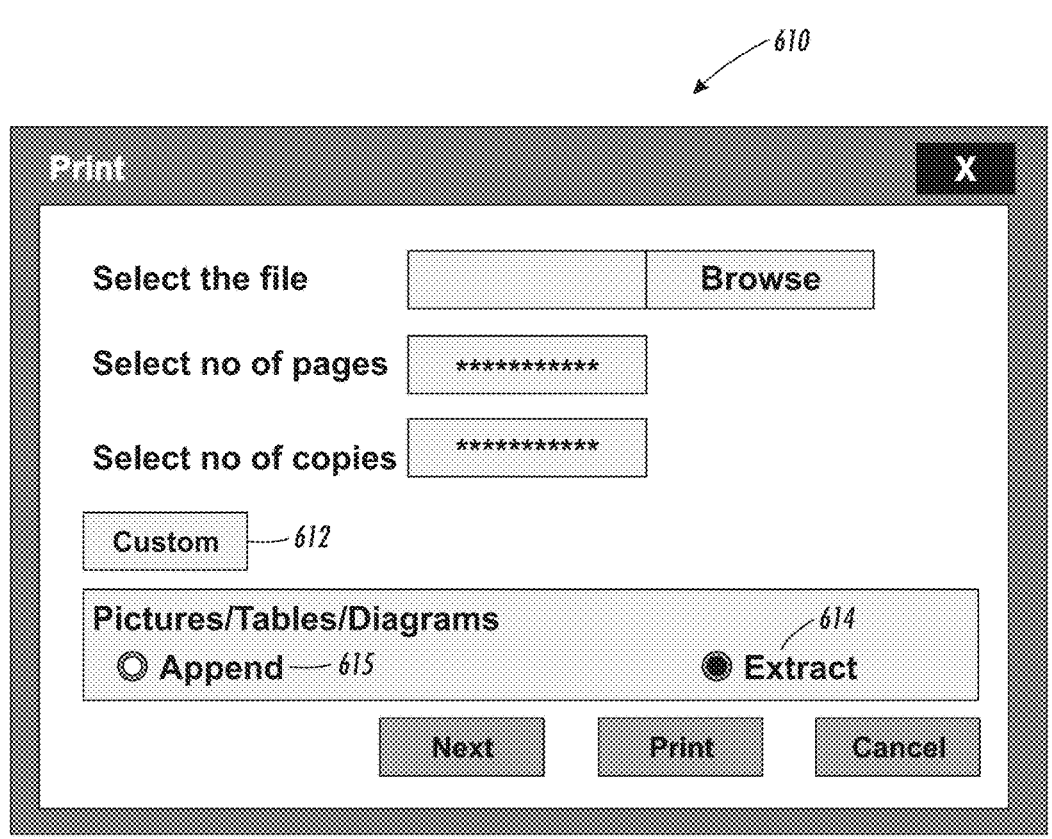

FIG. 6B shows a custom option (marked as 612) for the user, the custom option 612 allows the user to print the referenced content either as a part of the document or separately. The user interface 610 further provides a custom option where the referenced content can be appended (using option 615) or can be extracted (using option 614). For simplicity, the referenced content may be pictures, tables or diagrams.

Figure 6C:
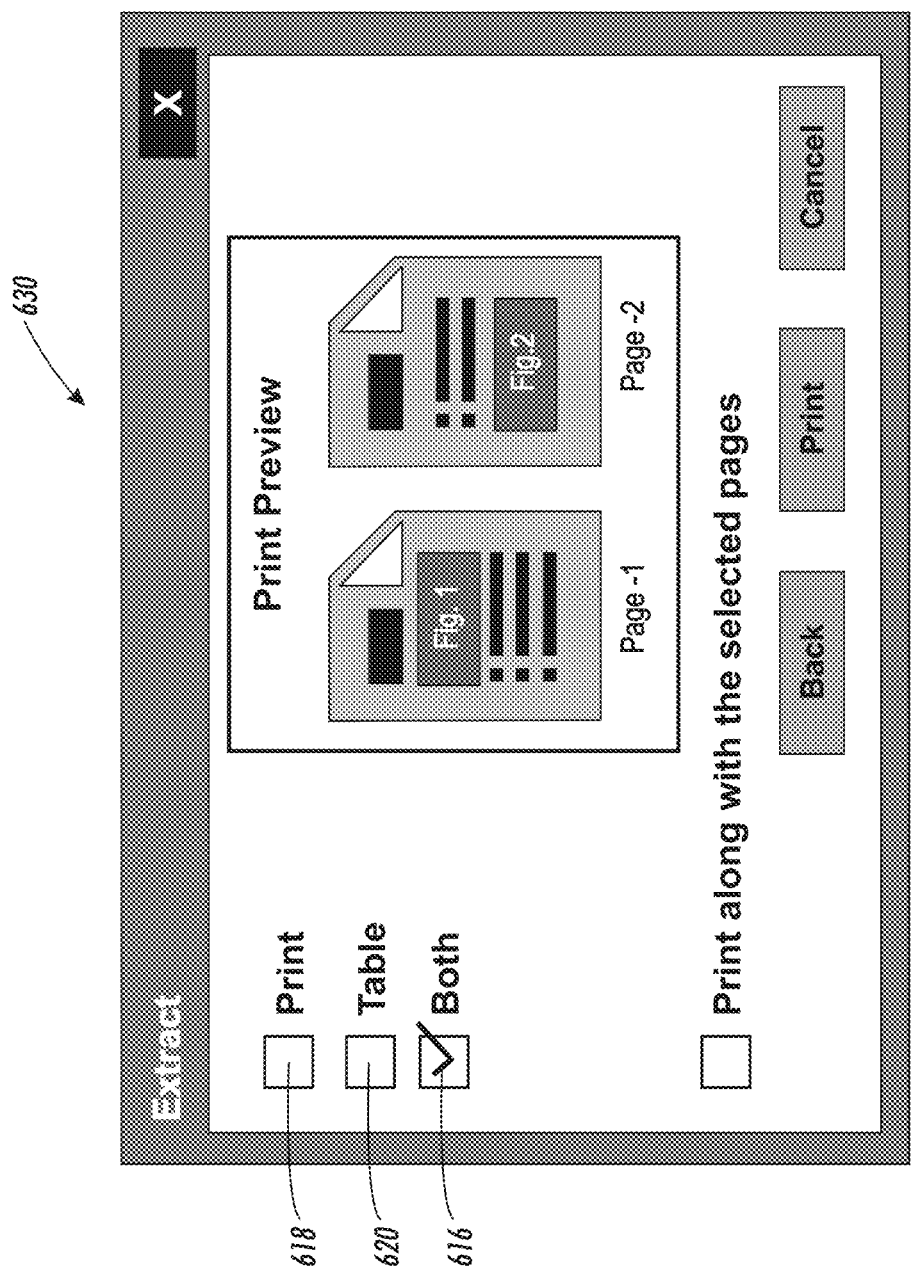

As shown in the snapshot 610, the user selects extract option (marked as 614). When the user chooses the extract option, the multi-function device automatically extracts the referenced content say figures or diagrams. The extract option further allows the user to export either pictures (marked as 618) or tables (marked as 620) or both in the given files (marked as 616). This is shown in the snapshot 630 of FIG. 6C.

Figure 6D:
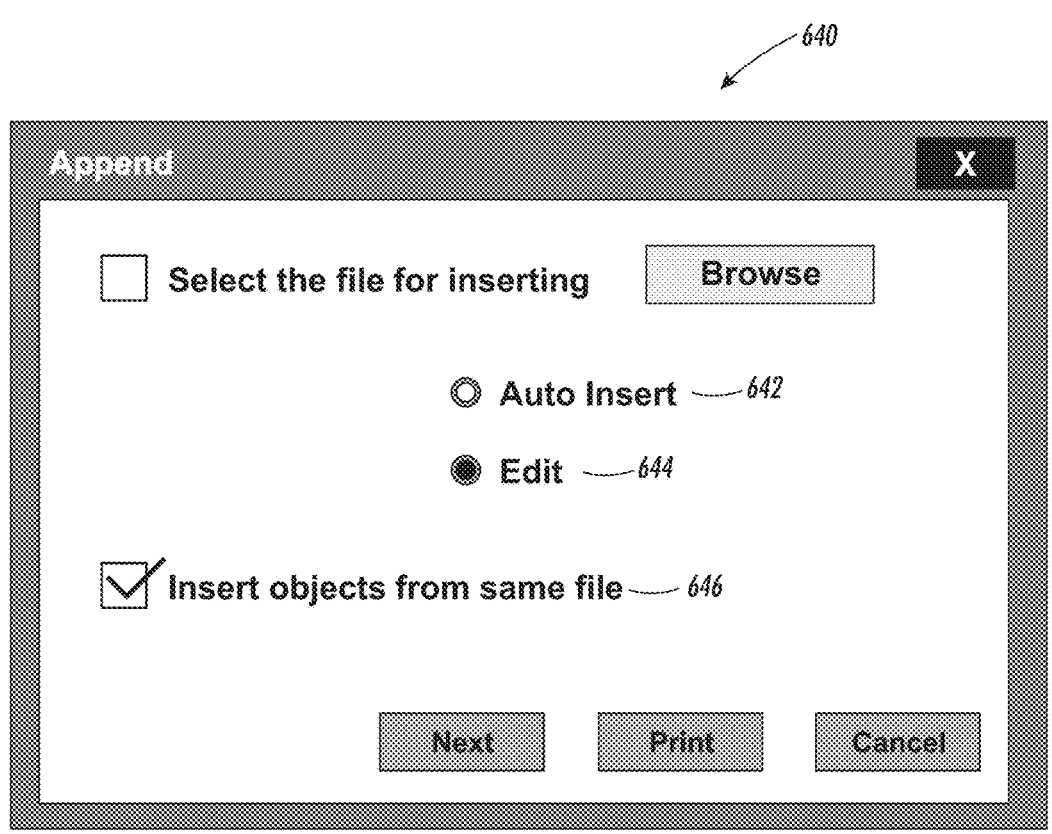
Figure 6E:
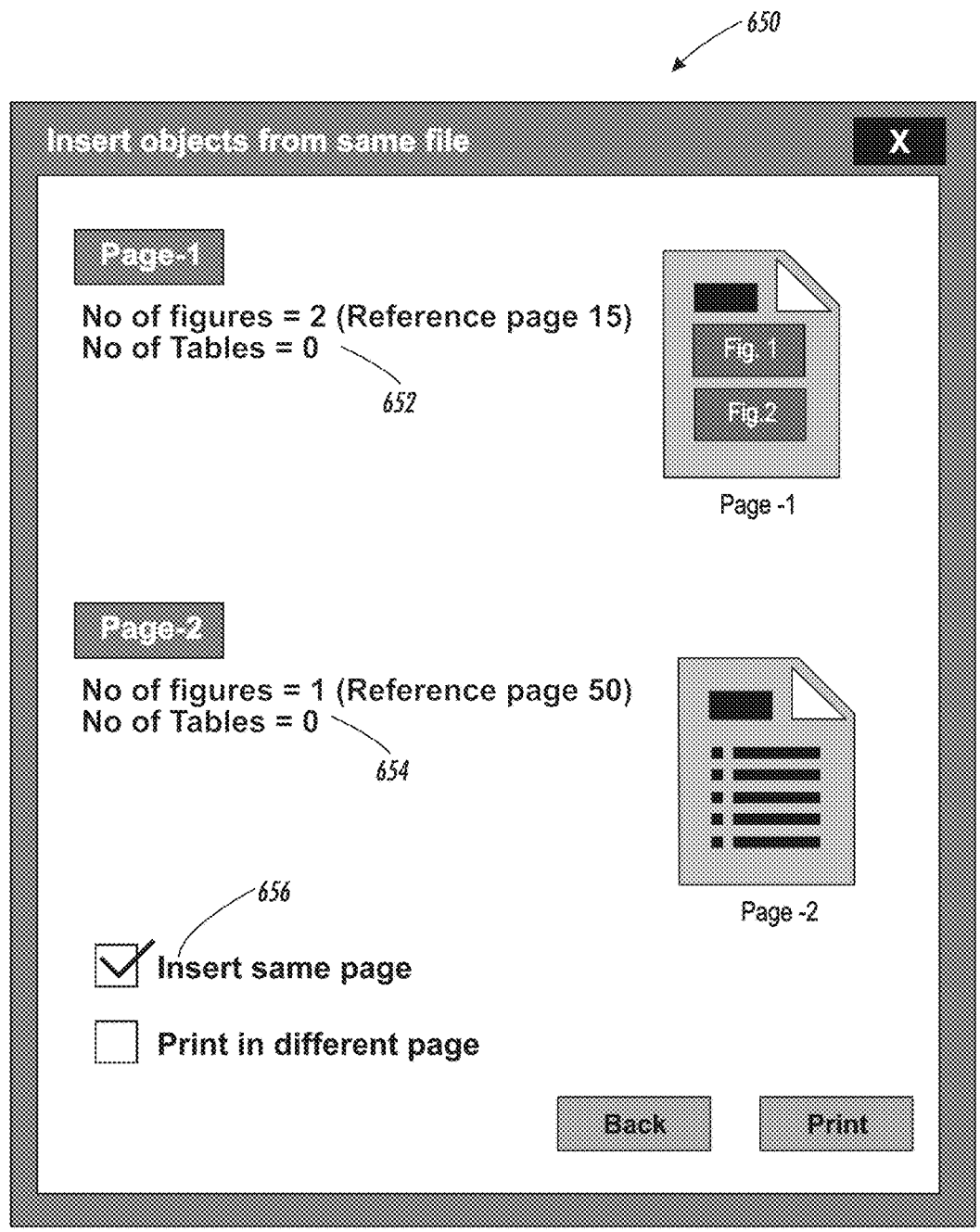
Figure 6F:
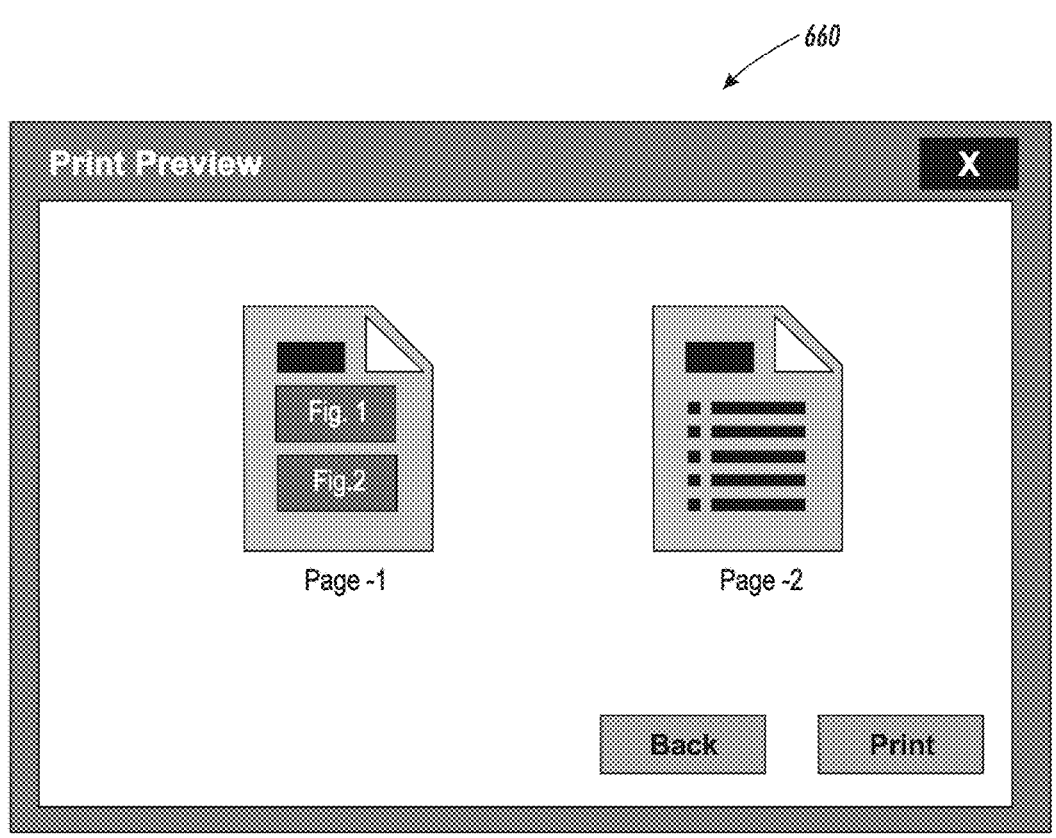

FIGS. 6D, 6E and 6F show user interfaces for appending option. The appending option allows the user to get the referenced content embedded inside the resulting printed document. As shown in the snapshot 640, the user can append diagrams or tables from an external file via an Auto Insert option (marked as 642). Here, the multi-function device automatically inserts the pictures or diagrams in the given document using the auto insert option. The user may further select the pictures or diagrams from the same file. In such cases, the user may select the option marked as 646. If the user wishes to modify the automatically inserted documents, he can go with the edit option (marked as 644) to edit the documents as required.

After the option of inserting the pictures or diagrams from the same file, the multi-function device displays an option marked as 656 to insert the pictures or diagrams in the same page where the reference is identified, i.e., on page 1 and page 2. The user interface 650 of FIG. 6E further displays the number of references appear on a particular page. For example, on page 1, the number of references include number of figures and number of tables (marked as 652). In another example, on page 2, the number of references include number of figures and number of tables (marked as 654). Along with this, the reference page is also displayed such as "reference page 15." The multi-function device displays a print preview dialog box 660 as shown in FIG. 6F.

The present disclosure is implemented when a request to print a subset of pages from a document, is received. The disclosure is useful for environments that perform document research and documentation (e.g., education, legal). The disclosure can also be utilized in multiple scenarios, for example, when a user wants to only extract content such as pictures/tables/figures from a document and save or print the pictures/tables/figures. The document may be a scanned document or normal electronic document. In another example, the disclosure can be utilized when a user wants to only extract the content such as pictures/tables/figures from one document, but the user wants to append the pictures/tables/figures content to another document without using multiple software applications or tools. The document and another document may be a scanned document or normal electronic document. In such scenarios, the user provides an input to identify the pictures/tables/figures such as figure number (FIG. 2), table number (table 5) and the pictures/tables/figures are extracted based on the input. As a next step, the pictures/tables/figures are processed as discussed above.

The present disclosure provides methods and systems for managing referenced content, specifically, focuses on printing a referenced content while printing a document. The methods and systems automatically identify and print the referenced content. The methods and systems provide a customized option to the user for printing the referenced content, thus helps the user to efficiently print the all the referenced content in simple manner without any loss. By providing the customized option, the methods and systems remind or suggest the user to print the referenced content. The methods and systems help the user to extract the referenced content from the scanned documents and print/save it as a different file. Here, the extraction/appending feature can be utilized by all users without using any third-party applications which is complex and time consuming. In this manner, the methods and systems help the user work more efficiently and save time and excess printing costs.

For a person skilled in the art, it is understood that the use of phrase(s) "is," "are," "may," "can," "could," "will," "should," or the like is for understanding various embodiments of the present disclosure and the phrases do not limit the disclosure or its implementation in any manner.

It is emphasized that the term "comprises" or "comprising" is used in this specification to specify the presence of stated features, integers, steps or components, but does not preclude the addition of one or more further features, integers, steps or components, or groups thereof.

The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above described system and/or the apparatus and/or any electronic device (not shown).

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms are deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "scanning," or "analyzing," or "storing," or "generating," or "receiving," "or transmitting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above-disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method, comprising:
   receiving one or more pages of a document for printing by a multi-function device, the one or more pages comprising content, wherein at least one page selected for printing includes a reference, wherein content corresponding to the reference is not selected for printing;
   automatically analyzing the content of the at least one page selected for printing to identify the reference;
   automatically identifying the content corresponding to the identified reference;
   automatically displaying the identified referenced content along with a page including the referenced content via a user interface; and
   printing the referenced content and the one or more pages selected for printing.

2. The method of claim 1, further comprising appending the referenced content to the one or more pages selected for printing.

3. The method of claim 1, further comprising printing the referenced content as a part of the one or more pages selected for printing.

4. The method of claim 3, further comprising checking available space on the page including the reference.

5. The method of claim 4, further comprising fitting the referenced content on the page including the reference, based on the available space.

6. The method of claim 1, further comprising printing the referenced content along with the one or more pages selected for printing.

7. The method of claim 6, further comprising extracting the referenced content from the page including the referenced content.

8. The method of claim 1, wherein the reference is identified when a request to print a subset of pages of the document is received.

9. The method of claim 1, wherein the reference is identified based on one or more keywords.

10. The method of claim 1, wherein the referenced content is a part of one of: the document and a new document.

11. The method of claim 1, further comprising providing a user interface to select a print output type for the referenced content.

12. A multi-function device, comprising one or more processors configured to:
    receive one or more pages of a document for printing, the one or more pages comprising content, wherein at least one page selected for printing includes a reference, wherein content corresponding to the reference is not selected for printing;
    automatically analyze the content of the at least one page selected for printing to identify the reference;
    automatically identify the content corresponding to the identified reference;
    display the identified referenced content along with a page including the referenced content; and
    print the referenced content and the one or more pages selected for printing.

13. The multi-function device of claim 12, wherein the one or more processors are configured to append the referenced content to the one or more pages selected for printing.

14. The multi-function device of claim 12, wherein the one or more processors are configured to print the referenced content as a part of the one or more pages selected for printing.

15. The multi-function device of claim 14, wherein the one or more processors are configured to check available space on the page including the reference.

16. The multi-function device of claim 15, wherein the one or more processors are configured to fit the referenced content on the page including the reference, based on the available space.

17. The multi-function device of claim 12, wherein the one or more processors are configured to print the referenced content along with the one or more pages selected for printing.

18. The multi-function device of claim 17, wherein the one or more processors are configured to extract the referenced content from the page including the referenced content.

19. The multi-function device of claim 12, wherein the referenced content is a part of one of the document, and a new document.

20. The multi-function device of claim 12, wherein the one or more processors are configured to provide an option to a user to select a print output type for the referenced content.

21. The multi-function device of claim 20, wherein the print output type comprises one of extraction of the referenced content and appending of the referenced content.

22. A method for printing one or more pages and related referenced content, the method comprising:
    receiving a request for printing one or more pages, wherein the one or more pages comprise content, wherein at least one page selected for printing comprises reference to the content, wherein content corresponding to the reference is not selected for printing;
    analyzing the at least one page selected for printing to identify the reference;
    identifying the content corresponding to the reference;
    providing a user interface to a user to select an option for printing the content corresponding to the reference;

processing the content corresponding to the reference in accordance with the selected option; and printing the content corresponding to the reference in accordance with the selected option and the one or more pages.

23. The method of claim 22, wherein the option comprises extracting the content corresponding to the reference and appending the content corresponding to the reference.

24. The method of claim 22, further comprising printing the content corresponding to the reference as a part of the one or more pages selected for printing.

25. The method of claim 22, further comprising printing the content corresponding to the reference along with the one or more pages selected for printing.

26. The method of claim 22 is implemented by a non-transitory computer-readable media having computer-executable instructions.

* * * * *